United States Patent [19]

Awakowicz et al.

[11] Patent Number: 4,845,760
[45] Date of Patent: Jul. 4, 1989

[54] ELECTRO-ACOUSTIC TRANSDUCER ARRANGED WITHIN THE HANDSET OF A TELEPHONE INSTRUMENT

[75] Inventors: Erwin Awakowicz, Munich; Kurt Schiller, Mering, both of Fed. Rep. of Germany

[73] Assignee: Siemens Aktiengesellschaft, Berlin and Munich, Fed. Rep. of Germany

[21] Appl. No.: 917,971

[22] Filed: Oct. 14, 1986

[30] Foreign Application Priority Data

Oct. 25, 1985 [DE] Fed. Rep. of Germany ....... 3538054

[51] Int. Cl.⁴ .......................... H04M 1/04; H04R 1/02
[52] U.S. Cl. ..................... 381/188; 379/433; 379/437; 381/158; 381/189
[58] Field of Search ............... 381/188, 158, 205, 190, 381/189; 379/433, 437, 451

[56] References Cited

U.S. PATENT DOCUMENTS

| | | | |
|---|---|---|---|
| 2,757,247 | 7/1956 | Gavreau | 381/158 |
| 3,156,788 | 10/1964 | Kuskin | 381/158 |
| 3,257,516 | 6/1966 | Knowles | 381/158 |
| 3,383,475 | 5/1968 | Wiggins | 381/188 |
| 4,528,426 | 7/1985 | Fatovic et al. | 381/158 |

FOREIGN PATENT DOCUMENTS

| | | | |
|---|---|---|---|
| 0271147 | 3/1965 | Australia | 381/190 |
| 1199138 | 1/1986 | Canada | 379/433 |
| 112106 | 11/1968 | Denmark | 381/169 |
| 1437433 | 10/1968 | Fed. Rep. of Germany . | |
| 2440985 | 3/1976 | Fed. Rep. of Germany | 379/437 |
| 3107308 | 9/1982 | Fed. Rep. of Germany . | |
| 3402639 | 8/1985 | Fed. Rep. of Germany | 379/433 |
| 3420562 | 12/1985 | Fed. Rep. of Germany . | |
| 1152433 | 2/1958 | France | 381/188 |
| 55-41011 | 3/1980 | Japan | 381/158 |
| 60-74857 | 4/1985 | Japan | 379/433 |
| 2152784 | 8/1985 | United Kingdom | 379/433 |

Primary Examiner—Jin F. Ng
Assistant Examiner—Danita R. Byrd
Attorney, Agent, or Firm—Hill, Van Santen, Steadman & Simpson

[57] ABSTRACT

An electro-acoustic transducer is arranged within the handset of a telephone instrument. The transducer is elastically seated and is seated at a distance from the walls of the handset so that noises caused by the handset are not transmitted onto the transducer.

2 Claims, 2 Drawing Sheets

ELECTRO-ACOUSTIC TRANSDUCER ARRANGED WITHIN THE HANDSET OF A TELEPHONE INSTRUMENT

BACKGROUND OF THE INVENTION

1. Field of the Invention

The present invention relates to an electro-accoustic transducer, particularly a piezo-microphone, arranged within a handset of a telephone instrument.

2. Description of the Prior Art

The electric-acoustic transducers in the handset of a telephone instrument are usually seated in pots composed of plastic which are connected to the sides of the handset facing away from the speaking and listening openings. Whereas the speaking and listening sides were previously closed by way of screw-on, pot-like covers, more recent handsets are usually composed of two shell halves which are connected to one antoher, for example, by way of screws. Given the present trend of designing the two-shell handsets to be lighter and lighter, however, the problem arises that the shells move towards one another given even a slight pressure on the handset and, therefore, clicks are generated. Exactly the same noises are generated by swinging the handset cord and are transmitted to the handset body. Presently employed electro-acoustic transducers, particularly the piezo-microphone, are extremely sensitive with respect to their transmission properties, so that the clicks are forwarded to the other party.

SUMMARY OF THE INVENTION

It is therefore an object of the present invention to provide a fastening of the transducer, particularly of a piezo-microphone, with which the transmission of noises by way of the handset onto the transducer can be prevented.

The above object is achieved, according to the present invention, in that the transducer is elastically seated and located at a distance from the walls of the handset.

In that the transducer is not held in a pot within the handset, the structure-born noise cannot be transmitted from the handset housing onto the transducer. As a result thereof, a transmission of undesired noises which are disturbing to the partner in the call can be avoided in a simple manner.

At its cylindrical generated surface, the electro-acoustic transducer is surrounded by an elastic jacket, preferably by a rubber jacket, which comprises a peripheral sealing lip at that side facing the listening or, respectively, speaking openings of the handset and which has means for fastening the transducer within the handset. As a result of providing a peripheral sealing lip, a good acoustical and elastic connection between the transducer and the listening or speaking openings in the handset is achieved. A first possibility for elastic sealing of the transducer within the handset is that the jacket comprises fastening clips which are provided with openings, these beings located at a side facing away from the sealing lip and serving for receiving a shackle arranged in the handset. These fastening clips can further be provided with projections extending toward the sealing lip in order to achieve a defined spacing from the transducer.

A further possibility for the elastic sealing of the transducer is that the jacket comprises a plurality of webs extending radially relative thereto, these webs being pressed into receptacles arranged within the handset. At their free ends, the webs can comprise stops connected thereto in an integrated one-piece structure. The elastic stops can be fashioned, for example, such that they lie against the inner walls of the handset body so that the transducer is located in a previously-defined position within the handset housing.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

The fastening of the piezo-microphone in a handset of a telephone instrument should occur such that the piezo-microphone is elastically seated and is seated at a distance from the shelves.

Figure 1:
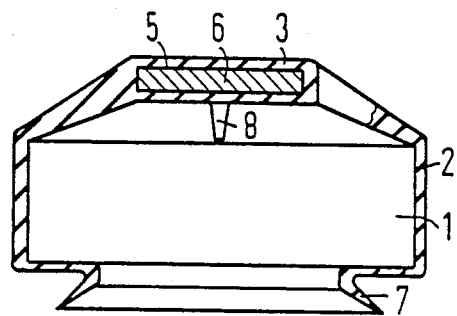
FIG. 1 is a sectional view of the suspension mechanism for a piezo-microphone.
Figure 2:
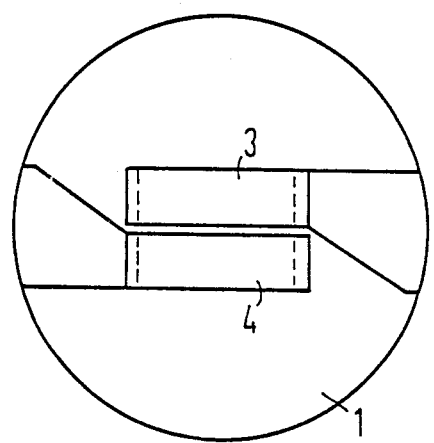
FIG. 2 is a plan view of the arrangement of FIG. 1.
Figure 3:
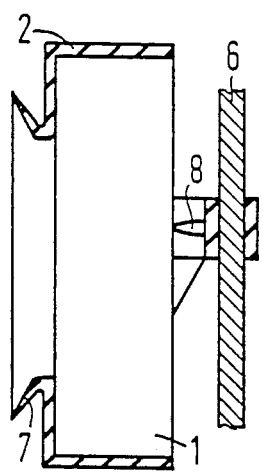
FIG. 3 is a further side view of the arrangement of FIG. 1, shown in section.

Referring to FIGS. 1–3, the piezo-microphone 1 is surrounded by a rubber jacket 2 at its cylindrical surface. Two fastening clips 3 and 4 are connected as one piece to the rubber jacket 2, the clips respectively comprising an opening 5 having a rectangular cross-section in the fastening region. A shackle 6 is plugged through the openings 5, the shackle being capable of being secured, for example, within the body of the handset. The fastening clips 3 and 4 further comprise a projection 8 which abuts the piezo-microphone. In the region of the rubber jacket 2 lying opposite the fastening clips 3 and 4, the rubber jacket 2 comprises a peripheral sealing lip 7 connected thereto as a one-piece structure. In the fastening condition of the piezo-microphone 1, the sealing lip 7 lies against the speaking side of the handset.

Figure 4:
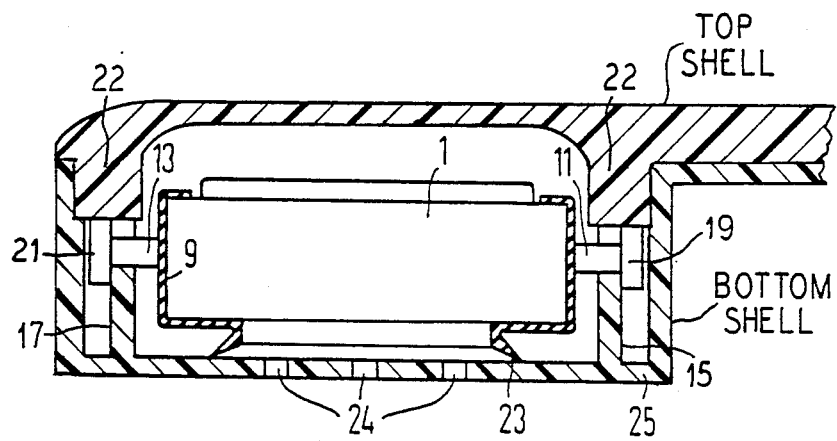
FIG. 4 is a sectional view of a further embodiment of a suspension mechanism for a piezo-microphone.
Figure 5:
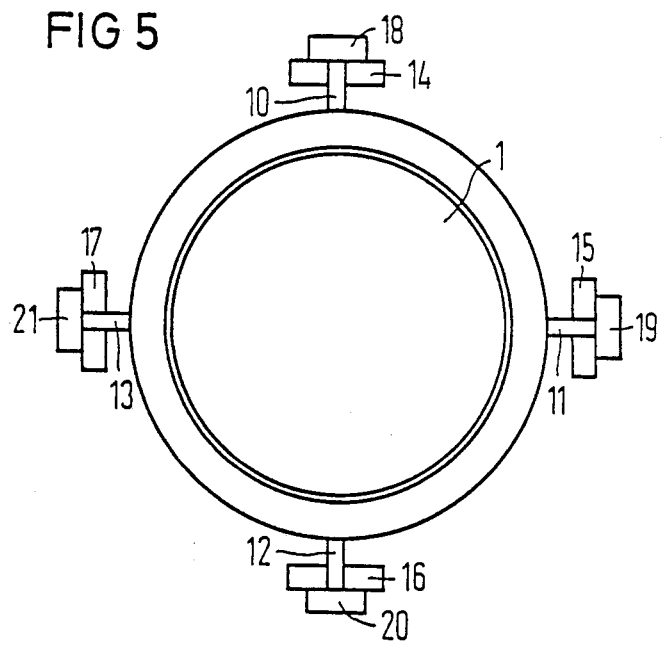
FIG. 5 is a plan view of the arrangement of FIG. 4.

Given the exemplary embodiment shown in FIGS. 4 and 5, the piezo-microphone 1 is again surrounded by a rubber jacket at its cylindrical surface. The rubber jacket 9 comprises a plurality of webs 10, 11, 12 and 13 extending radially therefrom, the webs being pressed into web-like receptacles 14, 15, 16 and 17 arranged in the handset. A defined position of the suspension mechanism in the built-in condition of the piezo-microphone 1 is achieved by a plurality of stops 18, 19, 20, and 21 which are applied to the free ends of the webs 10, 11, 12 and 13. The webs are prevented from sliding out of the receptacles by a support 22 which lies against the stops. The rubber jacket 9 likewise comprises a peripheral sealing lip 23 integral therewith which lies against the handset 25 in the region of the speaking openings 24.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A transducer apparatus having a housing containing a transducer having a cylindrical cross-section and a cylindrical wall, comprising:

a rubber jacket having a cylindrical wall surrounding said cylindrical wall of said transducer and having a plurality of webs extending from an outside surface of said cylindrical wall of said rubber jacket and having a peripheral sealing lip on a first end of said rubber jacket, said sealing lip contacting said housing, said webs being spaced apart around a circumference of said rubber jacket;

each of said webs having a stop integral therewith on a free end thereof for engaging means for providing a receptacle, said means for providing a receptacle being attached to said housing.

2. Means for mounting a transducer in a handset, comprising:

a rubber jacket adapted to surround a cylindrical wall of said transducer, said rubber jacket including a peripheral sealing lip extending from one axial end thereof to engage a surface of said handset and to surround said transducer at a sound wave receptor portion thereof, said rubber jacket also including a flange located at another axial end thereof and projecting radially inward from said jacket for engaging a surface of said transducer, and said rubber jacket having a plurality of webs extending radially outward from an outside surface of said rubber jacket and being spaced apart around a circumference of said rubber jacket, each web having a stop integral therewith on a free end thereof for operatively engaging an appropriately formed receptacle of said handset.

* * * * *